United States Patent
Küch et al.

(10) Patent No.: US 6,789,747 B2
(45) Date of Patent: Sep. 14, 2004

(54) NOZZLE FOR A WINDSHIELD WASHING SYSTEM OF A MOTOR VEHICLE

(75) Inventors: Theo Küch, Nentershausen (DE); Willi Neumann, Bebra (DE)

(73) Assignee: Siemens Aktiengesellschaft, Munich (DE)

(*) Notice: Subject to any disclaimer, the term of this patent is extended or adjusted under 35 U.S.C. 154(b) by 126 days.

(21) Appl. No.: 10/106,819

(22) Filed: Mar. 27, 2002

(65) Prior Publication Data

US 2003/0006308 A1 Jan. 9, 2003

(30) Foreign Application Priority Data

Mar. 28, 2001 (DE) .......................................... 101 15 542

(51) Int. Cl.[7] ................................................. B05B 1/10
(52) U.S. Cl. ................... 239/284.1; 239/71; 239/284.2; 239/587.5; 239/589.1
(58) Field of Search ............................ 239/71, 73, 247, 239/284.1, 284.2, 587.1–587.5, 589.1

(56) References Cited

U.S. PATENT DOCUMENTS

| | | | | |
|---|---|---|---|---|
| 2,990,980 A | * | 7/1961 | Gronemeyer | 239/587.5 |
| 6,050,503 A | * | 4/2000 | Suhring et al. | 239/284.1 |
| 6,247,652 B1 | * | 6/2001 | Stange et al. | 239/284.1 |
| 6,296,198 B1 | * | 10/2001 | Tores | 239/284.1 |
| 6,554,210 B2 | * | 4/2003 | Holt et al. | 239/284.2 |
| 6,626,377 B1 | * | 9/2003 | Vogt | 239/284.1 |

* cited by examiner

Primary Examiner—Steven J. Ganey
(74) Attorney, Agent, or Firm—Morrison & Foerster LLP

(57) ABSTRACT

A nozzle for a windshield washing system of a motor vehicle is proposed, in which the nozzle insert can be inserted into the nozzle housing at different angles. In particular, the nozzle housing has a fine toothing, via which different inclination angles of the nozzle insert are fixed.

6 Claims, 2 Drawing Sheets

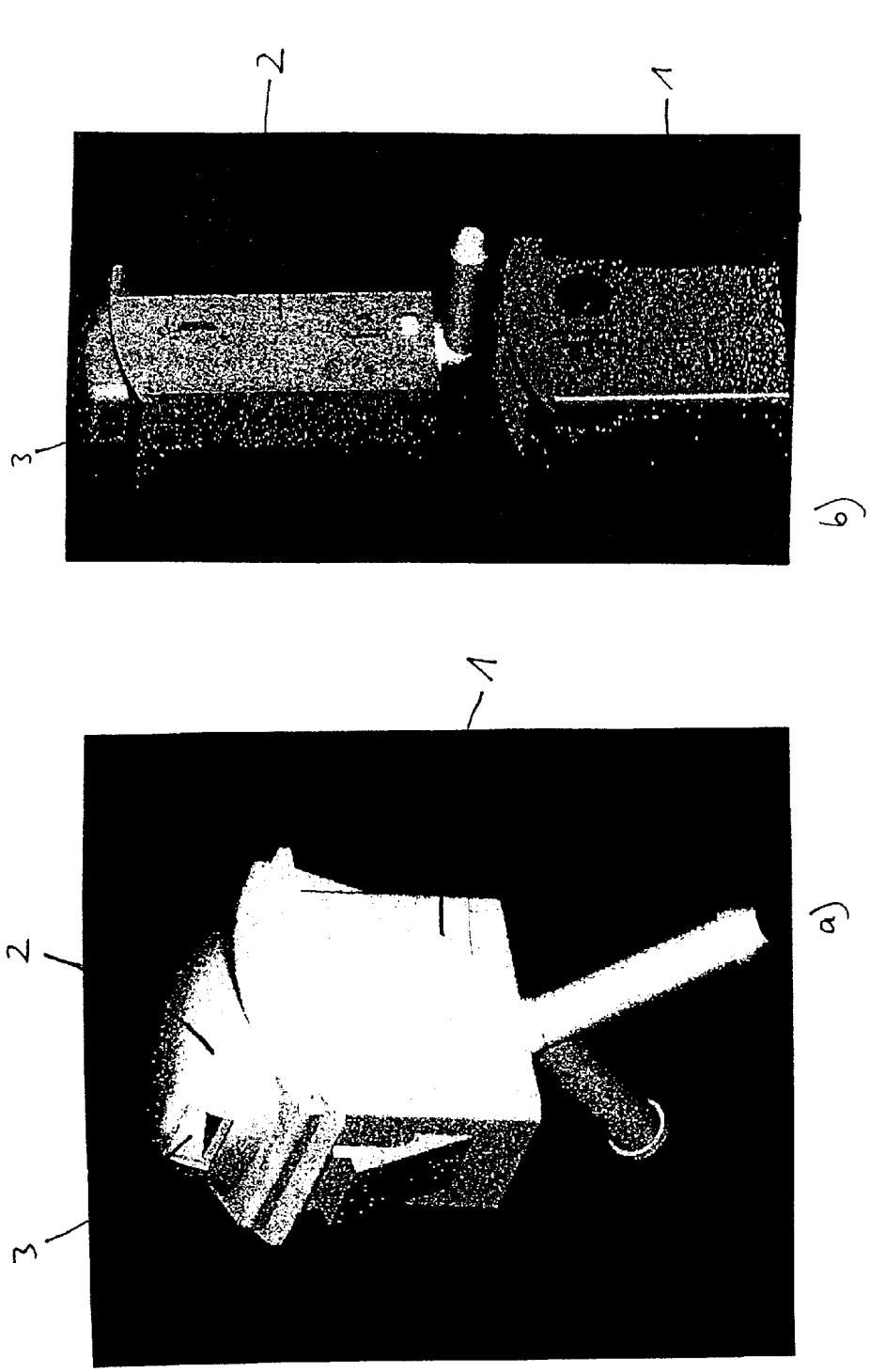

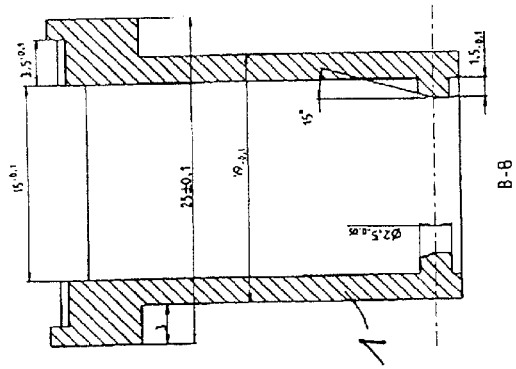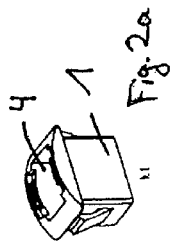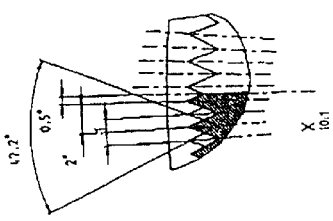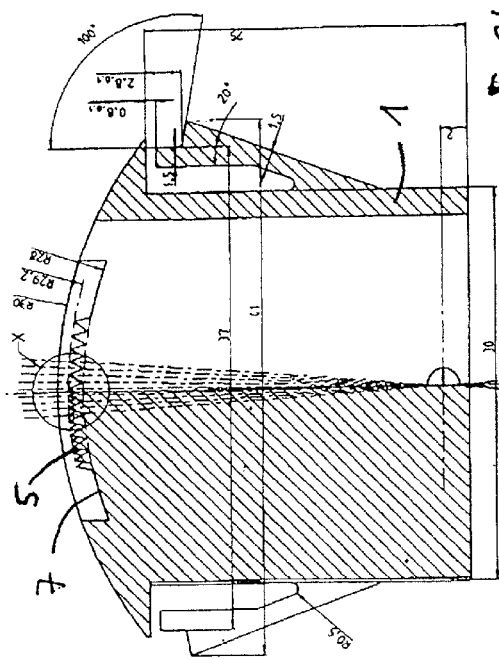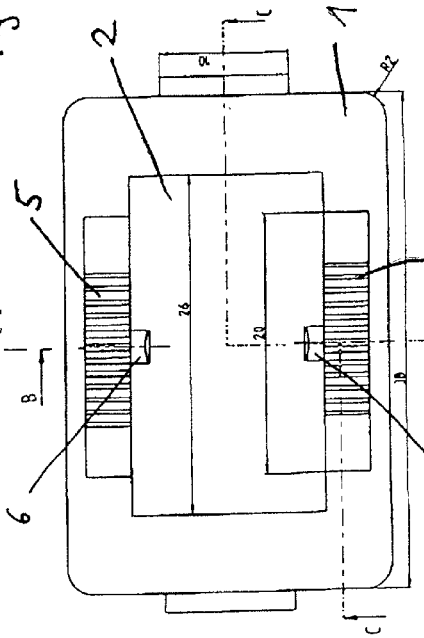

NOZZLE FOR A WINDSHIELD WASHING SYSTEM OF A MOTOR VEHICLE

CLAIM FOR PRIORITY

This application claims priority to Application No. DE 101 15 542.5 which was filed in the German language on Mar. 28, 2001.

TECHNICAL FIELD OF THE INVENTION

The invention relates to a nozzle for a windshield washing system of a motor vehicle, and in particular, to a nozzle having a nozzle housing with a reception well, into which a nozzle insert with a liquid-jet outlet is inserted.

BACKGROUND OF THE INVENTION

Nozzles are typically arranged in motor vehicles, for example, in front of the windshield, so that, when required, the windshield can be cleaned by cleaning liquid being sprayed onto it. In different vehicles, such a nozzle, as a rule, has to be arranged at a different distance from and at a different angle of inclination to the windshield. The latter is necessary, so that the liquid jet impinges onto the windshield in a region which is optimum for cleaning the windshield.

The nozzle housing is therefore conventionally produced specifically for the vehicle as an injection molding. Different injection molds are necessary for this purpose, thus incurring considerable costs.

The Siemens AG patent application no. 100 20 044.3 discloses a nozzle for the windshield washing system of a motor vehicle, in which the nozzle insert can be inserted into the reception well in two different ways. This results, depending on the orientation of the spray-nozzle insert, in two different spray angles, thus affording the possibility of adapting the nozzle to two different vehicles.

SUMMARY OF THE INVENTION

The invention specifies a nozzle for a windshield washing system of a motor vehicle, by means of which different jet inclination angles can be set and which can therefore be used for different vehicles.

In one embodiment of the invention, the nozzle insert can be inserted into the nozzle housing at different angles. What is achieved thereby is that the jet angle can be adapted to the different conditions in various motor vehicles. The result of this is that one and the same nozzle can be used for different motor vehicles, the jet angle being changed solely by the nozzle insert being inserted into the nozzle housing at different inclination angles. It is thereby possible to make marked cost savings which relate both to the costs for injection molds and to the storage costs.

In one aspect of the invention, the nozzle housing has means for fixing the nozzle insert at the different inclination angles. What is achieved thereby is that the angle of the liquid-jet outlet remains permanently set at the value which is optimum for the respective vehicle. This may be achieved, in particular, by the nozzle housing having a fine toothing, via which the different predefined inclination angles of the nozzle insert are fixed. Radial displacement of the nozzle insert is reliably avoided by means of the fine toothing.

In another embodiment, different inclination angles of the nozzle insert are fixed in a predetermined grid. The predetermined grid may, in particular, define constant angular intervals at which the inclination angle of the nozzle insert can be adjusted. The grid also makes it possible to change the inclination angle in different angular steps, the individual angular steps being adapted to the desired inclination angles for individual vehicle types. The setting of the nozzle insert for a specific vehicle type is thereby implemented in a particularly simple way.

In still another embodiment, the nozzle insert is fixed at a center of rotation common to the inclination angles. A reliable fastening of the nozzle insert in the nozzle housing is achieved as a result. In particular, the nozzle insert can be fixed in the nozzle housing by means of a snap connection at the center of rotation common to the inclination angles.

The change in the inclination angle of the nozzle insert can be achieved by the nozzle insert being pressed out of the reception well, the nozzle subsequently being pivoted in the well into the desired inclination angle and the nozzle insert being fixed once again by being pressed into the nozzle well.

The nozzle insert may be, in particular, a fluidic element which is designed in such a way that the emerging liquid jet alternates between two outlet angles.

BRIEF DESCRIPTION OF THE DRAWINGS

The invention is described in more detail below with reference to exemplary embodiments and the drawings in which:

FIG. 1a shows an overall view of the nozzle in the present invention.

FIG. 1b shows the nozzle housing and the nozzle insert separated.

FIG. 2a shows an illustration of the nozzle housing in the present invention.

FIG. 2b shows a section through the nozzle housing.

FIG. 2c shows a top view of the nozzle housing with the reception well and with the toothing.

FIG. 2d shows the toothing enlarged.

DETAILED DESCRIPTION OF THE PREFERRED EMBODIMENTS

FIG. 1a shows an overall illustration of the nozzle with the nozzle housing 1 and with the nozzle insert 2 located in it. FIG. 1b shows the nozzle housing 1 and the nozzle insert 2 are separated. The nozzle insert 2 has a surface 3 in which there is a jet outlet orifice. The nozzle has a presetting and can be mounted as a ZSB nozzle or assembled unit with a presetting in the water box cover. In order to adapt the jet inclination angle of the nozzle to different vehicles, the nozzle insert can be inserted into the nozzle housing at different angles and is fixed securely at the different inclination angles. Unintentional misadjustment is prevented as a result.

Fixing is achieved, according to the invention, by a fine toothing in the nozzle housing, which is illustrated in more detail in FIG. 2. FIG. 2a shows the nozzle housing 1 in a perspective view, the housing 1 having a reception well 4 for the nozzle insert. FIG. 2b shows a section through the nozzle housing 1. In the upper region of the nozzle 1, in which the nozzle insert rests on the nozzle housing, a curved bearing surface 7 with a toothing 5 is provided. The toothing 5 is illustrated, enlarged, in FIG. 2d.

The nozzle insert, not illustrated in FIG. 2, has an engagement element which engages in the toothing 5 of the nozzle housing. The engagement element may, in particular, likewise be a toothing. By these two fine toothings being engaged in one another, angular misadjustment of the nozzle insert within the reception well is avoided, but at the same time different angular positions of the nozzle insert can be produced by virtue of appropriate dimensioning of the nozzle housing and of the reception well.

FIG. 2c shows a top view of the nozzle housing 1 with the reception well 2 and with the toothing 5. Also illustrated, on the nozzle housing in the reception well, are fastening elements 6, by which the nozzle insert is fixed in the housing 1, the fixing point being the center of rotation of the nozzle insert.

A change in the inclination angle of the nozzle insert within the reception well can be achieved by the nozzle insert first being pressed slightly out of the nozzle well. Hence, the toothing between the housing 1 and the nozzle insert is released. It is thus possible for the nozzle to pivot in the well, and, by the nozzle insert being pressed in once again in the reception well, the nozzle insert is fixed once more. Fixing is in this case achieved by a snap connection.

The variable design according to the invention of a fluidic nozzle makes it possible to use identical nozzles with different inclination angle positionability, along with the same well and the same hole pattern in the water box.

What is claimed is:

1. A nozzle for a windshield washing system of a motor vehicle, comprising:

a nozzle housing with a reception well; and a nozzle insert with a liquid-jet outlet which is inserted into the nozzle housing, wherein the nozzle insert is configured for insertion into the nozzle housing at different predefined inclination angles, wherein the nozzle housing has a fine toothing, via which different inclination angles of the nozzle insert are fixed, the nozzle insert is fixed in the nozzle housing by a snap connection at the center of rotation common to the predefined inclination angles, and the insertion angle of the nozzle insert is changed by the nozzle insert being pressed out of the nozzle well, the nozzle being pivoted in the well and fixed thereto.

2. The nozzle as claimed in claim 1, wherein the nozzle housing has means for fixing the nozzle insert at different inclination angles.

3. The nozzle as claimed in claim 2, wherein the nozzle housing has a fine toothing, via which different inclination angles of the nozzle insert are fixed.

4. The nozzle as claimed in claim 1, wherein the different inclination angles of the nozzle insert are fixed in a predetermined grid.

5. The nozzle as claimed in claim 1, wherein the nozzle insert is fixed at a center of rotation common to the predefined inclination angles.

6. The nozzle as claimed in claim 1, wherein the nozzle insert is a fluidic element.

* * * * *